(12) United States Patent
Prasad

(10) Patent No.: US 8,414,665 B2
(45) Date of Patent: Apr. 9, 2013

(54) PRODUCTION OF FUNCTIONALLY EFFECTIVE ORGANIC MOLECULES FROM LIGNITE CLEAVAGE

(75) Inventor: Durga Yandapalli Prasad, Andhra Pradesh (IN)

(73) Assignee: Bijam Biosciences Private Limited, Hyderabad (IN)

( * ) Notice: Subject to any disclaimer, the term of this patent is extended or adjusted under 35 U.S.C. 154(b) by 0 days.

(21) Appl. No.: 12/312,244

(22) PCT Filed: Nov. 2, 2007

(86) PCT No.: PCT/IB2007/003324
§ 371 (c)(1),
(2), (4) Date: Oct. 6, 2009

(87) PCT Pub. No.: WO2008/053339
PCT Pub. Date: May 8, 2008

(65) Prior Publication Data
US 2010/0029982 A1 Feb. 4, 2010

(30) Foreign Application Priority Data
Nov. 3, 2006 (IN) .......................... 2020/CHE/2006

(51) Int. Cl.
*C10L 5/00* (2006.01)
(52) U.S. Cl. .......................................... 44/620; 562/475
(58) Field of Classification Search .................. 44/620; 562/475
See application file for complete search history.

(56) References Cited

U.S. PATENT DOCUMENTS

| | | | | |
|---|---|---|---|---|
| 2,949,350 A | * | 8/1960 | Heinze et al. | 562/509 |
| 3,398,186 A | * | 8/1968 | Schwartz | 562/405 |
| 4,912,256 A | * | 3/1990 | Cronje | 562/465 |
| 5,004,831 A | * | 4/1991 | Dekker et al. | 562/475 |
| 5,415,778 A | | 5/1995 | Zanin et al. | |
| 7,896,944 B2 | * | 3/2011 | Karr | 71/9 |

FOREIGN PATENT DOCUMENTS

| FR | 1140910 A | 8/1957 |
|---|---|---|
| WO | WO 87/02355 A1 | 4/1987 |

OTHER PUBLICATIONS

Nalwalk et al, "Peroxidation of coal-analysis of minerals", Energy Sources, 1974, vol. 1(2), pp. 179-187.
Liu et al, "GC/MS analysis of water-soluble products from the mild oxidation of longkou brown coal with $H_2O_2$", Energy & Fuels, 2003, vol. 17, pp. 424-426.

(Continued)

*Primary Examiner* — Cephia D Toomer
(74) *Attorney, Agent, or Firm* — Foley & Lardner LLP

(57) ABSTRACT

A novel functionally effective organic molecules with various molecular weights are produced by cleaving lignite with hydrogen peroxide or alkaline hydrogen peroxide predominantly below 1000 molecular weight, the said functionally effective organic molecules, molecular weights varies depending on the reaction conditions such as concentration of hydrogen peroxide, time of reaction, temperature, ratio of lignite to hydrogen peroxide, lignite quality etc. conditions. These organic molecules are functionally effective than normal organic molecules (humic, fulvic acids etc.) present naturally in lignite or leonardite due to enhanced reactive nature obtained by treating with hydrogen peroxide or alkaline hydrogen peroxide which are resultant of cleavage of lignite. These functionally effective organic molecules have utilities in various areas such as agriculture and medicine.

4 Claims, 2 Drawing Sheets

Figure 1:
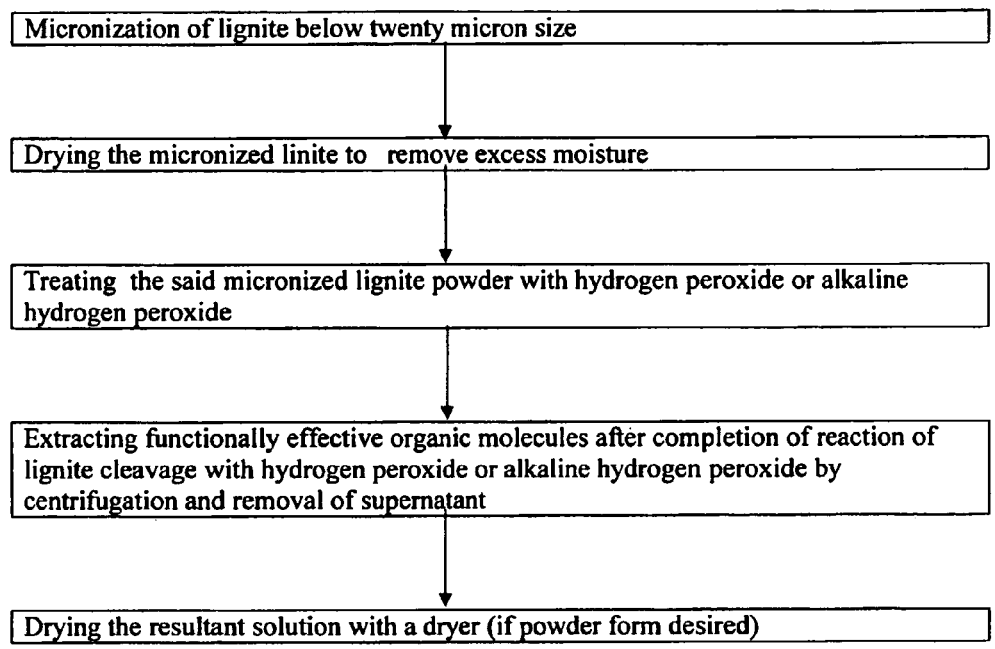

FLOW DIAGRAM OF MANUFACTURING FUNCTIONALLY EFFECTIVE ORGANIC MOLECULES FROM LIGNITE

OTHER PUBLICATIONS

Miura et al, "New oxidative degradation method for producing fatty acid in high yields and high selectivity form low-rank coals", Energy & Fuels, 1996, vol. 10, pp. 1196-1201.

Peiris et al, "The use of Ca-modified, brown-coal-derived humates and fulvates for treatment of soil acidity", Aust. J. Soil Research, 2002, vol. 40(7), pp. 1171-1186.

* cited by examiner

FLOW DIAGRAM OF MANUFACTURING FUNCTIONALLY EFFECTIVE
ORGANIC MOLECULES FROM LIGNITE

PRODUCTION OF FUNCTIONALLY EFFECTIVE ORGANIC MOLECULES FROM LIGNITE CLEAVAGE

FIELD OF THE INVENTION

This invention in general relates to the field of material sciences. In particular, this invention pertains to production of functionally effective organic molecules from lignite cleavage. This invention also relates to a method of manufacturing functionally effective organic molecules from lignite having applications in various fields such as medicine and agriculture.

BACKGROUND OF THE INVENTION

Lignite also referred to as brown coal is the lowest rank of coal and used almost exclusively as fuel for steam electric generation. Although there are attempts to produce value added products for other utilities, the major consumption of the lignite is aimed majorly for power generation. Lignite, which is rich in carbon is the result of decomposition of vegetation over a millions of years ago which underwent compaction and heating. Because of its vegetative origin, this material is very rich in various functionally effective organic molecules and it will be more beneficial to use these functionally effective organic molecules present in lignite.

These functionally effective organic molecules are functionally effective than normal organic molecules (humic, fulvic acids etc.) present in lignite or leonardite due to enhanced reactive nature obtained by treating with hydrogen peroxide or alkaline hydrogen peroxide which are resultant of cleavage of lignite.

Therefore the objective of the present invention is to invent a method of producing functionally effective organic molecules from lignite by cleaving with Hydrogen Peroxide or with alkaline hydrogen peroxide.

OBJECTS OF THE INVENTION

Accordingly the primary object of this invention is to invent functionally effective organic molecules production from lignite which is beneficial for various applications in medicine and agriculture. Another objective of this invention is to develop production method of functionally effective organic molecules from lignite.

Yet another objective of this invention is to invent functionally effective organic molecules of various molecular weights which will be useful in medicines to treat various diseases including viral diseases.

Still another objective of this invention is to provide a necessary method for production of desired cleavage products of various molecular weights that are useful in deriving nutrients in agricultural utilities.

These molecules have the ability that can be used for both plant protection and nutrition with dual action.

Yet another objective of this invention is to produce functionally effective organic molecules to synthesize various organic hybrids that are having applications in various areas such as pollution control.

SUMMARY OF THE INVENTION

To meet the above objects and others, present invention provides novel functionally effective organic molecules from lignite which are active constituents having utility in various areas such as therapeutic purposes, nutritional purposes, immobilization purposes and also having scope to design products with specificity and selectivity to obtain superior performance.

DETAILED DESCRIPTION OF THE INVENTION

Now this invention will be described in detail so as to illustrate and explain various salient features of the invention. One embodiment of the invention is to provide functionally effective organic molecules production by cleaving lignite with Hydrogen Peroxide or alkaline hydrogen peroxide. Another embodiment of the present invention relates to a method of production of desired molecular weight functionally effective organic molecules by appropriate reaction with hydrogen peroxide or alkaline hydrogen peroxide.

This method also involves production of functionally effective organic molecules which are soluble that can be ligated with desired single and/or multiple combinations that have utilities to treat diseases, to design effective nutrients, to prepare organic inorganic hybrids etc.

In a preferred embodiment, the present invention provides method of producing organic molecules from lignite and said method comprising the following steps:
(a) Micronization of lignite below twenty micron size
(b) Drying the micronized lignite to remove excess moisture
(c) Treating the said micronized lignite powder with hydrogen peroxide or alkaline hydrogen peroxide
(d) Extracting functionally effective organic molecules after completion of reaction of lignite cleavage with hydrogen peroxide or alkaline hydrogen peroxide by centrifugation and removal of supernatant.
(e) Drying the resultant solution with a dryer (if powder form is desired).

In another embodiment, powdering of the lignite material was obtained by grinders and micronization of lignite powder is effected by using micronizer to obtain desired particle size in microns.

In one more embodiment, the reaction of lignite with hydrogen peroxide or alkaline hydrogen peroxide is optimized by variable compositions at variable temperatures for obtaining desired molecular weight functionally effective organic molecules from lignite cleavage.

In another embodiment, the resultant solution obtained by Hydrogen Peroxide or alkaline hydrogen peroxide cleavage of lignite is purified by centrifugation.

In another embodiment, the resultant solution is ultrafiltered to obtain desired molecular weight molecules.

Hydrogen Peroxide or alkaline hydrogen peroxide treatment with lignite results in production of small size organic molecules which are soluble in nature.

BRIEF DESCRIPTION OF THE ACCOMPANYING DRAWINGS

FIG. 1 relates to the various steps involved in the manufacturing process of functionally effective organic molecules from lignite.

Figure 2:
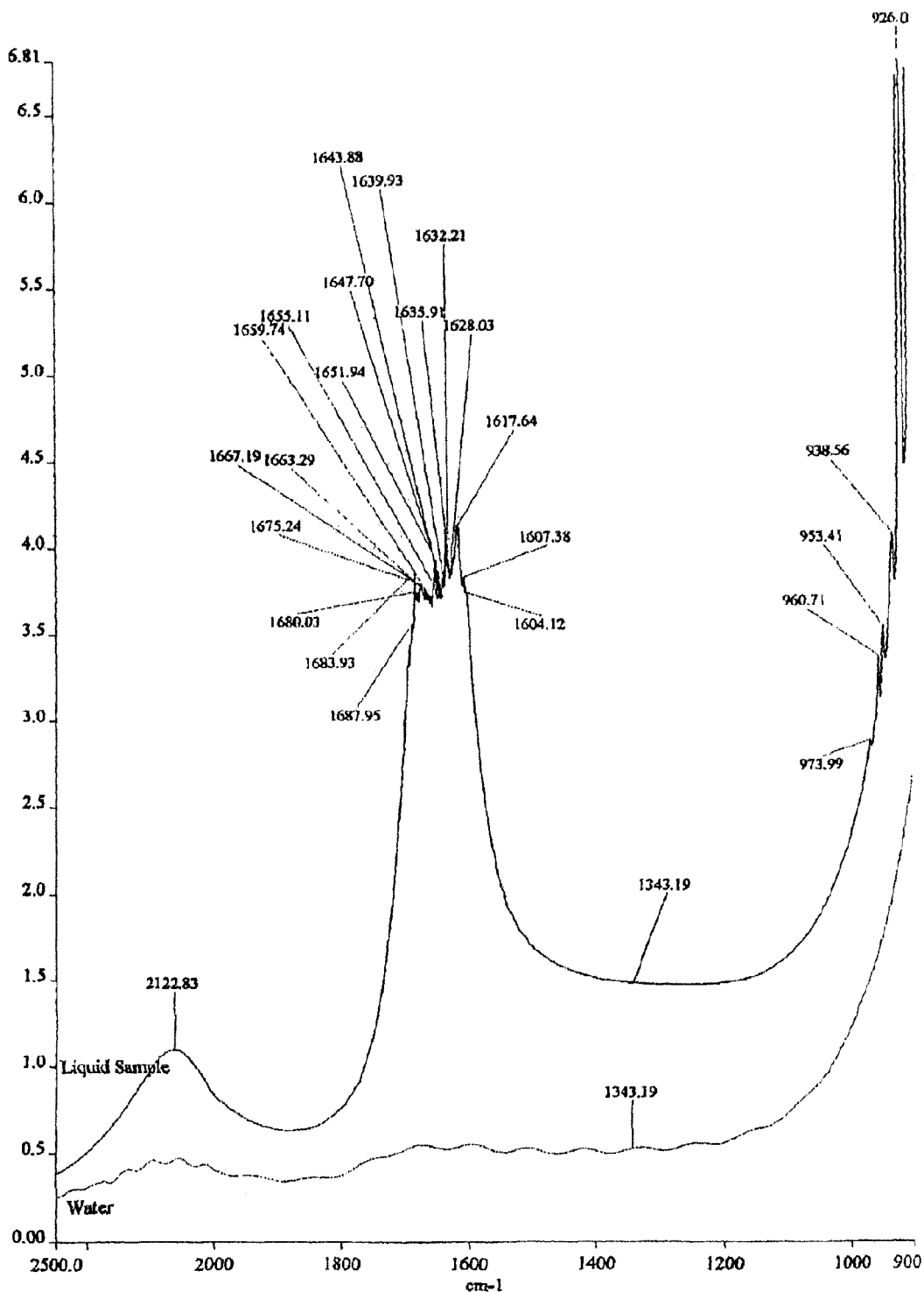

FIG. 2 relates to FTIR analysis of functionally effective organic molecules produced from lignite by cleaving with hydrogen peroxide.

Now the invention will be described in the following description. The nature of the invention and the manner in which the invention is to be carried out will be described in detail:

FIG. 1 relates to the various steps involved in the manufacturing process of functionally effective organic molecules from lignite.

FIG. 2 relates to FTIR analysis of functionally effective organic molecules that are being produced from lignite. The liquid samples were analyzed by FTIR in calcium fluoride cell accessory in FTIR. The characteristic absorbance of peaks at 1600±200 wave numbers (cm-1) were observed.

Now the applicant provides following specific description by way of examples and illustrations of the invention and this should not be construed to limit the scope of the invention in any manner.

5-25% of hydrogen peroxide was added to micronized lignite at a ratio of 1:2 to 1:5 (v/w) based on lignite quality. Before addition, hydrogen peroxide was cooled at −20° C. for few hours. The reaction was carried at 10° to 15° C. for one hour and later 20° C. for three hours. After this reaction, the same step was repeated twice or thrice or more times depending on the type of the lignite. Later, 50% hydrogen peroxide was directly added to the resultant substance at room temperature i.e. 25 to 30° C. at a ratio of 1:1 (v/w). The resultant material was extracted with water and centrifuged at 5,000 to 10,000 RPM on continuous centrifugation to obtain soluble functionally effective organic molecules from lignite by cleaving with hydrogen peroxide. Intense treatment with hydrogen peroxide with more concentration, time, temperature, dose results with less molecular weight functionally effective organic molecules, whereas, the size of functionally effective organic molecules derivitization depends on the reaction conditions of lignite with hydrogen peroxide.

Alkaline hydrogen peroxide (containing alkali, NaOH or KOH ((1-10%) with hydrogen peroxide (0.2 to 20%) was added to lignite at ratio of 1:2 to 1:5 depending on lignite quality. The reaction was carried out at room temperature (25° to 30° C.). After 2-6 hours of reaction the functionally effective organic molecules were extracted by precipitation or centrifugation.

5 ml of organic molecule extraction was added to 500 ml of water containing 20 PPM of uranyl nitrate. After mixing properly, the solution was centrifuged at 5000 RPM and uranium content was estimated by colorimetric method using PAR reagent at 540 nm. Functionally effective organic molecules decontaminated uranium significantly by reducing to PPB levels from PPM levels.

3 ml of functionally effective organic molecules extraction was added to 100 ml of distilled water and rice seeds were allowed to germinate in Petri plates. About 100 rice seeds were placed in 16 cm diameter/Petri plates, after placing whatman filter paper at the bottom of Petri plate containing 100 ml of distilled water. After 10 days, enhanced growth was observed in treated plants with 15-20% biomass enhancement indicating the growth enhancing nature of the functionally effective organic molecules which can contribute to yield enhancement.

Chelated plant nutrients were manufactured by reacting plant nutrients with functionally effective organic molecules for enhanced absorption and enhanced utilization efficiency for both foliar and soil application. For example: solution of copper nitrate, zinc nitrate, magnesium nitrate with or without alcohol were added to functionally effective organic molecules extraction for chelation.

Organic phosphate fertilizers were manufactured by addition of functionally effective organic molecules extracted from lignite with phosphate fertilizes (1-10% v/v) such as super phosphate, DAP. These functionally effective organic molecules were added to phosphoric acid (1-10% v/v) and with this organic phosphoric acid using suitable fillers phophatic fertilizers were prepared. These organic phosphate fertilizers were applied on crops like cotton, groundnut, rice, as basal dose enhanced yield up to 10-20% when compared to regular phosphatic fertilizers. Functionally effective organic molecules addition to phosphate fertilizers did enhance the phosphate availability to the plants.

When tested for the size of these functionally effective organic molecules by ultrafiltration using Amicon stirred ultrafiltration cell (Millipore), most of the functionally effective organic molecules are below 1000 molecular weight.

The soluble functionally effective organic molecules along with small percentage of hydrogen peroxide with or without alcohols when sprayed on various crop pests controlled the pest population along with enhancement of yield.

These functionally effective organic molecules have potentiality to treat plant and animal viral diseases.

These organic molecules which are soluble can be used as fertigation products.

The soluble functionally effective organic molecules immobilized on various substances sequestered metals, peptides etc. molecules.

The soluble functionally effective organic molecules have the property to precipitate metals, proteins, viruses etc., in solution.

The functionally effective organic molecules binding with organic or inorganic polymers, metals yield various materials that have utility in different areas.

The left over material after removal of soluble functionally effective organic molecules has utility as plant nutrient/fertilizer when blended with various fertilizers enhanced crop yields.

Present innovation explains production of novel functionally effective organic molecules with various utilities from lignite by cleavage with hydrogen peroxide or alkaline hydrogen peroxide.

The results derived from the present invention gives a scope of using functionally effective organic molecules from lignite for various uses in medicine, agriculture and other applications.

This invention has been explained by way of example, and the invention is not restricted to above explanation but also equally having valid scope and ambit for various applications.

It is understood that this invention is described with reference to specific embodiment. It is further understood that within the scope and ambit of this invention, various combinations are permissible.

I claim:

1. A process for extracting functionally effective organic molecules comprising humic acids and fulvic acids from lignite, said extraction process comprising steps of:
   (a) adding 5 to 25% of hydrogen peroxide with micronized lignite at a ratio of 1:2 to 1:5 (v/w), the hydrogen peroxide thus used is cooled up to about −20° C. prior to addition;
   (b) allowing the hydrogen peroxide to react with the micronized lignite at 10° to 15° C. for one hour to cleave the micronized lignite and then allow the reaction to proceed at 20° C. for three hours;
   (c) repeating step (b) more than once to complete cleavage of micronized lignite;
   (d) adding 50% hydrogen peroxide directly to a mixture of cleaved lignite obtained from steps (a)-(c) at 25° to 30° C. at a ratio of 1:1 (v/w); and
   (e) extracting a resultant mixture with water and centrifuging the same at 5,000 to 10,000 RPM using continuous centrifugation to obtain a liquid sample of functionally effective organic molecules, wherein the functionally effective organic molecules thus extracted predominantly comprise humic acids and fulvic acids having molecular weight below 1000 daltons; and wherein the functionally effective organic molecules thus extracted either (i) possesses an decontaminating capability of toxic heavy metals present in an aqueous solution; or (ii) possesses an enhancing property on plant growth and yield; or (iii) possesses both (i) or (ii) above; and wherein the liquid sample comprising the functionally effective organic molecules exhibit a characteristic absorbance peaks at $1600\pm200$ cm$^{-1}$ when analyzed by FTIR using a calcium fluoride cell.

2. A process for extracting functionally effective organic molecules comprising humic acids and fulvic acids from lignite, said extraction process comprising steps of:
  (a) adding alkaline hydrogen peroxide containing 1 to 10% of an alkali and 0.2 to 20% of hydrogen peroxide to lignite at ratio of 1:2 to 1:5 (v/w) and allowing a reaction to proceed at room temperature; and
  (b) extracting the functionally effective organic molecules by precipitation or centrifugation after 2-6 hours of reaction,
  wherein the functionally effective organic molecules thus extracted predominantly comprise humic acids and fulvic acids having molecular weight below 1000 daltons; and wherein the functionally effective organic molecules thus extracted either (i) possesses an decontaminating capability of toxic heavy metals present in an aqueous solution; or (ii) possesses an enhancing property on plant growth and yield; or (iii) possesses both (i) or (ii) above; and wherein a liquid sample comprising the functionally effective organic molecules exhibits a characteristic absorbance peak at $1600\pm200$ cm$^{-1}$ when analyzed by FTIR using a calcium fluoride cell.

3. A process as claimed in claim 1, wherein the functionally effective organic molecules thus extracted are functional derivatives of humic and fulvic acid present in lignite and have an enhanced reactive nature compared to humic and fulvic acids present in lignite, whereby the enhanced reactivity is obtained by treating lignite with hydrogen peroxide which results in cleavage of lignite.

4. A process as claimed in claim 2, wherein the functionally effective organic molecules thus extracted are functional derivatives of humic and fulvic acid present in lignite and have an enhanced reactive nature compared to humic and fulvic acids present in lignite, whereby the enhanced reactivity is obtained by treating lignite with alkaline hydrogen peroxide which results in cleavage of lignite.

* * * * *